Patented July 20, 1926.

1,593,030

UNITED STATES PATENT OFFICE.

ROBERT C. PALMER, OF PENSACOLA, FLORIDA, ASSIGNOR TO THE NEWPORT COMPANY, OF MILWAUKEE, WISCONSIN, A CORPORATION OF DELAWARE.

PROCESS OF TREATING PINE OIL.

No Drawing.   Application filed August 24, 1922. Serial No. 584,089.

It is well known that commercial pine oils do not have those essential properties such as capability of oxidation and a rapid evaporation which make gum spirits of turpentine or wood turpentine a valuable constituent of paints, varnishes and other liquid coating compositions used in the arts and industries. Pine oil is a well known by-product produced in the manufacture of wood turpentine.

I have discovered that pine oil can be converted into a product having the essential properties and characteristics of turpentine, by particular treatment of the pine oil, described below.

The process consists essentially in treating the pine oil with dehydrating agents of various kinds, such for example as zinc chloride, ferric chloride, aluminum chloride or other salts which by undergoing hydrolysis are capable of producing acidity. In place of such salts, acids can be employed directly, such as mineral acids, for example sulfuric, phosphoric, and hydrochloric acid; however to obtain the desired results and as shown in the examples hereinafter given, it is essential that the ratio of acids to pine oil be kept low, thereby resulting in dehydration rather than polymerization of the pine oil. The dehydration can also be effected by organic acids, such as oxalic, tartaric, acetic, formic and various others.

It is also possible to obtain good results by the use of mixtures of the salts referred to above with acids.

The reaction can be conveniently conducted by mixing the pine oil (which ordinarily does not contain any considerable amount of water) with any one or more of the chemicals above referred to, and by heating the mixture to a temperature below 200° C. In order to avoid as much as possible the objectionable high boiling polymerization products the reaction temperature should be kept well below 200° C., and excellent results are obtained by carrying out the reaction below 160° C.

The reaction can be conducted successfully at atmospheric pressure; however, the use of a partial vacuum or of pressure somewhat above atmospheric, is not precluded.

The material after heating is then allowed to cool off and the salts or acids added can readily be removed from the liquid oil by settling, washing, and neutralization. The product can then be further purified if desired by fractional distillation, either at atmospheric pressure or under vacuum.

Without confining myself to the details, the following specific example of the process is given for the purpose of illustration. This example being given purely in the illustrative and not restrictive sense.

1000 gallons of pine oil are charged into a cast iron or lead lined reaction kettle equipped with steam coils, a condenser, separator with return and bottom draw off. 50 pounds of phosphoric acid of 85% strength, and 50 pounds of 66° Bé. sulfuric acid are added to the cold oil. Then the temperature of this mixture is gradually raised to 120° C. Heat is then applied at such a rate as to bring the temperature from 120° C. to 150° C. in approximately two hours. The latter temperature is maintained until the maximum amount of low boiling oils has been obtained. The water split off during the reaction is condensed and collected, and is separated from the small amount of distilled oil by means of a gravity separator, and the oil is returned to the kettle. When the reaction is completed the heat is turned off and the contents of the kettle allowed to settle whereby an acid layer separates at the bottom. This acid layer is drawn off from the supernatant oil. The acidity of the oil is neturalized by the addition of sufficient soda ash. The oil is washed several times with water until it is completely neutral. It then may be transferred to a still and fractionally distilled through a column.

In order to demonstrate that a new and different product is produced by my process, the following physical constants (1) of pine oil, (2) the product produced by my process, which I will designate as converted pine oil, and (3) of turpentine are presented:

(1) *Physical constants of pine oil.*

1. Specific gravity at 15.5° C., .9330 to .9350.
2. Index of refraction at 20° C., 1.4798 to 1.4803.
3. Initial boiling point, 190° to 195° C.
4. Boiling point range 90% distils bet. 200 and 225° C.

5. Polymerization residue, 2 to 3%.
6. Flash point, 74 to 76° C.
7. Color, straw to reddish brown.

(2) *Physical constants of converted pine oil.*

1. Specific gravity at 15.5° C., .8620 to .8660.
2. Index of refraction at 20° C., 1.4780 to 1.5786.
3. Initial boiling point, 174 to 178° C.
4. Boiling point range, 90% distils below 190° C., 100% distils below 200° C.
5. Polymerization residue, 2 to 5%.
6. Flash point, 40 to 45° C.
7. Color, water-white to pale straw.

(3) *Physical constants of turpentine.*

1. Specific gravity at 15.5° C., .8620 to .8640.
2. Index of refraction at 20° C., 1.4668 to 1.4673.
3. Initial boiling point, 150 to 154° C.
4. Boiling point range, 90% distils below 170° C.
5. Polymerization residue, 2 to 3%.
6. Flash point, 34 to 36°.
7. Color, water-white.

I claim:—

1. A process of converting pine oil into a material similar in properties to turpentine, which comprises treating the said oil with a dehydrating agent in such proportions that when the mixture is heated between 100–220° C. water is split off and separating the dehydrated oil from the reaction products.

2. A process of converting pine oil into a material similar in properties to turpentine, which comprises treating the said oil with substantially below 3% of an inorganic acid material that will dehydrate the oil when the mixture is heated between 100–200° C., whereby water is split off and separating the dehydrated oil from the reaction products.

3. A process for the conversion of pine oil into a material similar in properties to turpentine, which comprises treating pine oil with an acid material at a temperature that will cause dehydration of the pine oil.

4. A process for the conversion of pine oil into a material similar in properties to turpentine, which comprises treating the said oil with an acid reacting substance that will dehydrate the said oil when the mixture is heated between 100–200° C., and capable of producing a product more closely resembling spirits of turpentine than does the untreated pine oil, such acid reacting substance being added in amounts insufficient to produce any substantial polymerization in the pine oil.

5. A process for the conversion of pine oil into a material similar in properties to turpentine, which comprises treating pine oil with a dehydrating agent that dehydrates the oil and produces a product more closely resembling spirits of turpentine than does the untreated pine oil.

In testimony whereof, I affix my signature.

ROBERT C. PALMER.